Dec. 5, 1939. B. BARR 2,182,462
COTTER PIN
Filed July 12, 1937

INVENTOR:
Byron Barr.
BY
ATTORNEY.

Patented Dec. 5, 1939

2,182,462

UNITED STATES PATENT OFFICE 2,182,462

COTTER PIN

Byron Barr, University City, Mo.

Application July 12, 1937, Serial No. 153,138

1 Claim. (Cl. 85—8.5)

The present invention relates to new and useful improvements in cotter pins of the usual split type, and, the invention has for its primary object, in a manner as hereinafter set forth, a device of this character comprising a novel construction, combination and arrangement of parts through the medium of which one of the legs can be gripped at its side edges by the jaws of a pair of pliers for the purpose of bending it outwardly after the cotter pin has been inserted through an opening in a machine element, or the like, designed to receive it without afterwards having to spread the free ends of the legs apart by means of a tool inserted between the legs of the cotter pin, thus permitting the cotter pin being expeditiously secured in position by persons having little, or no professional skill when working on the production line in an automobile assembly plant, repair shop and the like, where it is inconvenient to spread the legs apart by means of a sharp edged tool, and where the time of each operation is limited as in an automobile assembly plant.

Another and important object of the invention is to provide a cotter pin of the aforementioned character, in which the free end portions of the legs are of different widths.

Other objects of the invention are to provide a cotter pin of the split type which will be comparatively simple in construction, strong, durable, efficient and reliable in use, compact, and which may be manufactured at a comparatively low cost.

All of the foregoing and still further objects and advantages of the invention will become apparent from a study of the following specification, taken in connection with the accompanying drawing, wherein like characters of reference denote similar parts throughout the several views, and wherein.

Figure 1:
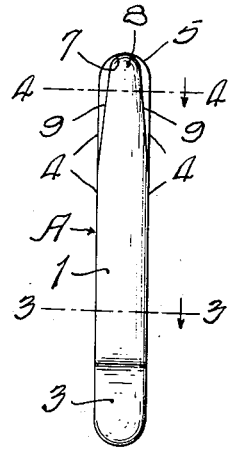
Fig. 1 is a side elevation of a cotter pin embodying the features of my invention and viewing it from the split side thereof.
Figure 2:
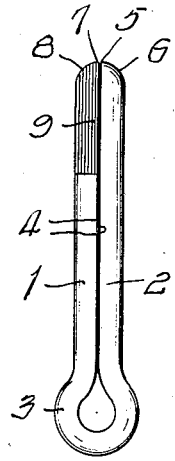
Fig. 2 is a view of the cotter pin similar to Fig. 1, but viewing it from the non-split side thereof.
Figure 6:
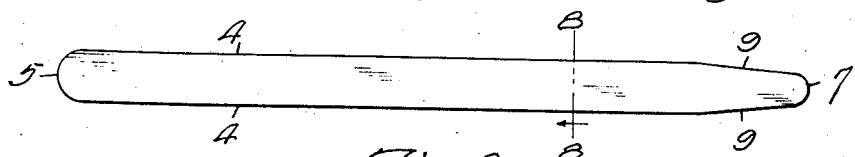
Fig. 6 is a plan view of the material before it is bent into cotter pin form.
Figure 7:
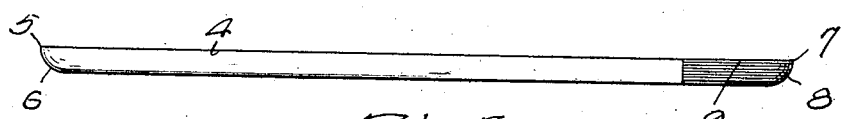
Fig. 7 is a side elevation of the cotter material shown in Fig. 6.
Figure 8:
Fig. 8 is a view taken on line 8—8 of Fig. 6.

Referring to the drawing, which shows a preferred embodiment of the invention, the cotter pin, as shown in Figs. 1 and 2, is designated, as A, and it consists of a piece of substantially half-round wire, or similar flexible material, shaped as shown in Figs. 6 and 7, and doubled, or folded upon itself to provide two legs designated 1 and 2 connected at their one end by a suitable loop 3 continuous of both legs. The legs 1 and 2 are arranged with their adjacent flat faces contacting each other.

Figure 3:
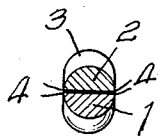
Fig. 3 is a view taken on line 3—3 of Fig. 1.
Figure 4:
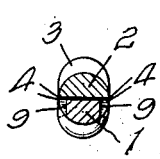
Fig. 4 is a view taken on line 4—4 of Fig. 1.
Figure 5:
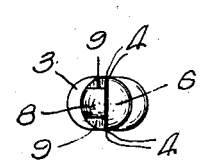
Fig. 5 is a top plan view of the cotter pin.

The legs 1 and 2 for the major portion of their length from the loop 3, form together a body substantially circular in cross-section and the side edges 4 thereof are in parallelism, as shown in Figs. 2 and 3.

The present invention resides more particularly in the novel construction of the free end portions of the legs 1 and 2, which construction will now be described.

As clearly shown in Figs. 6 and 7, the single piece of cotter pin material has its one free end face rounded off, as at 5 and 6.

The opposite end of the metal piece, as shown in Figs. 6 and 7, has its other free end face rounded off, as at 7 and 8, and the rounded end 7 is a smaller arc than the rounded end face 5, and the side faces of this end of the cotter pin material are beveled to provide the inclined side edges 9, which are continuous with the rounded end face 6 and the side edges 4 of the cotter pin piece.

When the cotter pin piece of material, as shown in Figs. 6 and 7 is doubled, or folded back upon itself to form the legs 1 and 2 connected by the loop 3, it will be clearly apparent from Fig. 1, that the free end portions of the side edges 4 of the leg 2 are freely exposed and not in parallelism with the inclined side edges 9 of leg 1, which edges 9 gradually converge toward each other and merge with the rounded end face 7 of leg 1, thereby exposing also part of the inside flat face of leg 2 on either side of the tapered free end portion of leg 1, and, thereby forming cotter pin legs of different widths and permitting, as is clearly apparent and manifest, ready grip upon the side edges 4 of leg 2, which are wider apart than the inclined edges 9 of leg 1, by a pair of pliers, not shown, for the purpose of bending the free end portion of leg 2 outwardly to secure the cotter pin in place, after it has been inserted through an opening in a machine element, thus obviating the necessity of having to insert a sharp tool between the free ends of the legs 1 and 2 to spread them sufficiently apart to bend either one leg or the other outwardly to be subsequently hammered down, as is usual, and manifest.

From the foregoing description, it will be apparent that the side edges of leg 2 are parallel for the entire length thereof, and that the side edges of the other leg 1 are parallel for the major portion of its length only thereby exposing the side edges of the free end portion of leg 2 to the ready grip of a pair of pliers without contacting tapered side edges at the free end portion of the cotter pin leg 1.

While the preferred embodiment of the invention shows the cotter material as substantially semi-circular in cross-section with its ends rounded off, as at 5, 6, 7 and 8, it is apparent that the ends need not necessarily be rounded off for certain classes of work, but one leg will always be wider than the other.

It is believed that the many advantages of a cotter pin constructed in accordance with the present invention, will be readily understood by those skilled in the art to which it appertains, and, although a preferred embodiment of the invention is as illustrated and described, it will be apparent and understood that changes in the very details of construction and in the combination and arrangement of parts, not involving the exercise of invention, may be resorted to without conflicting or departing from the spirit of the invention within the scope of the appended claim.

What I claim is:

A cotter pin comprising two legs of equal length connected midway their free ends by a loop and the inner faces of the legs normally contacting each other, the side edges of one leg being parallel for the entire length thereof, the side edges of the other leg being parallel for the major portion of its length from the loop toward the free end thereof, the remaining minor portion of said leg having its side edges inclined to expose the side edges of a minor portion of the length of the said one leg to the ready grip of a pair of pliers, and the end faces of both legs being transversely convexed.

BYRON BARR.